Patented Nov. 24, 1936

2,061,545

UNITED STATES PATENT OFFICE 2,061,545

CONVERSION PRODUCTS OF AZO DYE-STUFFS AND THEIR PRODUCTION

Jakob Bosshart, Riehen, near Basel, and Fritz Dobler, Basel, Switzerland, assignors to the firm of J. R. Geigy A. G., Basel, Switzerland No Drawing. Application August 24, 1934, Serial No. 741,332. In Germany September 15, 1933

6 Claims. (Cl. 260—70)

In the U. S. specification No. 1,850,875 is described a manufacture of conversion products of azo-dyestuffs by oxidizing, in the presence of ammonia, an azo-dyestuff containing resorcinol as coupling component. According to the U. S. specification No. 1,907,192 the said reaction can be conducted with advantage in the presence of a heavy metal, such as iron, copper or chromium, or a compound thereof. The dyestuffs so obtained are useful for dyeing leather.

According to the present invention the oxidation reactions above referred to are extended to polyazo-dyestuffs containing resorcinol as a coupling component and having the following con-'stitution:

Substituted amine (I) →middle component capable of being diazotized further (II) →resorcinol ← substituted amine or amino-azo-dyestuff (III), whereby there are to be understood under I aniline, its homologues and sulphonic acids, 1-aminonaphthalene-4-sulphonic acid, nitro-, chlor- and nitrochoranilines and their homologues and sulphonic acids, 1-amino-2-hydroxybenzene-3-carboxy-5-sulphonic acid, 4-nitro-4'-aminodiphenylamine-2-sulphonic acid and isomers thereof, 4, 6-dinitro-2-amino-1-hydroxybenzene; and under II 3-amino-1-hydroxybenzene-4-sulphonic acid, 1-aminonaphthalene, 1-aminonaphthalene-6 and 7-sulphonic acid (mixture), 2-amino-8-hydroxynaphthalene-6-sulphonic acid; and under III the amines named under I or 4'-amino-1, 1'-azobenzene-4-sulphonic acid.

In the U. S. specification No. 1,850,875 are described the conversion products resulting from the oxidation of mono-azo and disazo-dyestuffs containing resorcinol. It could not be foreseen that also trisazo- and tetrakisazo-dyestuffs containing resorcinol as a middle component could be rendered more valuable by oxidation. The dyestuffs obtainable in accordance with the invention are distinguished from those described in the aforesaid specification and from similar known dyestuffs by a still deeper shade and by the increased richness (this is especially evident in the case of weak dyeings) and beauty of the excellent and uniform brown shades which they produce on leather. Notable properties of the dyestuffs are their strongly diminished affinity for cotton and wool, their excellent solubility and their improved fastness, particularly towards light and towards alkaline fat liquors, as well as towards organic and inorganic acids.

The following examples illustrate the invention, the parts being by weight:—

Example 1

31 parts of 4-nitro-4'-amino-diphenylamine-2-sulphonic acid are diazotized in the usual manner and the diazo-compound is combined with 15 parts of 1-amino-naphthalene in a solution acid with acetic acid. The precipitated mono-azo-dyestuff is filtered, dissolved in caustic soda solution, diazotized indirectly in known manner and then combined with 11 parts of 1, 3-dihydroxybenzene in a cold solution alkaline with sodium carbonate.

When the formation of the disazo-dyestuff is completed, it is converted into a trisazo-dyestuff by combination with the diazo-compound of 21.8 parts of 5-nitro-2-aminobenzene-1-sulphonic acid in a solution alkaline with sodium carbonate. The dyestuff separated by acidification and salting-out, or if required the reaction solution itself, is mixed with sufficient ammonia to produce a distinctly ammoniacal reaction which will persist during the further treatment. The solution is then heated to 90° C. by means of a copper steam coil and at this temperature a slow current of air is passed through the solution for 15 hours. The dyestuff is then separated from the hot solution by acidification and salting-out. After having been dried it forms a blackish powder which dyes chrome-tanned or vegetable-tanned leather deep, dark brown shades.

The alkaline conversion of the trisazo-dyestuff leads to a substantial improvement in the fastness to acid and to alkali. The fastness to alkaline fat liquors, which, before the treatment, was only moderate, can, after the treatment, be considered as very good. The dyeings show an increased fastness to light and a shifting and deepening of the shade from reddish brown towards dark brown. Instead of 4-nitro-4'-aminodiphenylamine-2-sulphonic acid there may be used in this example other amines, such as 4-aminobenzene-1-sulphonic acid, an aminotoluene sulphonic acid, a chloraniline sulphonic acid, 1-aminonaphthalene-4-sulphonic acid or a nitraniline sulphonic acid. Instead of 5-nitro-2-aminobenzene-1-sulphonic acid there may be used 4-amino-benzene-1-sulphonic acid, a chloraniline sulphonic acid, 4-nitro-1-aminobenzene, a chloronitraniline or a nitro-aminodiphenylamine sulphonic acid.

Example 2

The mono-azo-dyestuff prepared in known manner from 23 parts of 1-amino-2-hydroxybenzene-3-carboxy-5-sulphonic acid and 23 parts of 1-amino-naphthalene-6 and 7-sulphonic acid (commercial mixture) is dissolved by the addition of cold caustic soda solution. The required quantity of sodium nitrite is then added and diazotation is brought about by running the solution into hydrochloric acid. The diazo-compound is then combined with 11 parts of 1,3-dihydroxybenzene in a solution alkaline with sodium carbonate and a trisazo-dyestuff is then formed by adding to the solution, alkaline with sodium carbonate, the clear diazo-solution prepared from 13.8 parts of 4-nitro-1-aminobenzene, coupling occurring very rapidly. By subjecting the trisazo-dyestuff to oxidation in presence of ammonia in the manner described in Example 1 there is obtained an easily soluble dyestuff which dyes leather full, dark brown shades. The dyeings have a much deeper shade and quite generally better fastness properties than those obtained with the unoxidized dyestuff. Valuable dyestuffs are obtained if instead of 1-amino-2-hydroxybenzene - 3 - carboxy - 5 - sulphonic acid there is used 4-aminobenzene-1-sulphonic acid, a 4 - nitro - 1 - aminobenzene sulphonic acid, 1-aminonaphthalene-4-sulphonic acid, or a nitroaminodiphenylamine sulphonic acid. Instead of 4-nitro-1-aminobenzene there may be used aniline, a chloraminobenzene or a sulphonic acid thereof, 4,6-dinitro-2-amino-1-hydroxybenzene, a nitroaminodiphenylamine sulphonic acid or 4'-amino-1,1'-azobenzene-4-sulphonic acid.

Example 3

50 parts of the trisazo-dyestuff, obtained by coupling diazotized 4-nitro-1-aminobenzene with 3-amino-1 - hydroxybenzene - 4 - sulphonic acid, further diazotizing the intermediate product and coupling with 1,3-dihydroxybenzene and finally combining the product with the diazo-compound of 5-nitro-2-aminobenzene-1-sulphonic acid, are dissolved in 500 parts of water at a raised temperature together with so much ammonia that the solution has a distinctly ammoniacal reaction and the solution is stirred at 85-90° C. whilst air is introduced. The pipe serving for introduction of the air and the steam coil serving for maintaining the temperature are of copper. The solution which is at first brownish-yellow becomes brown and the oxidation is completed when the color and strength of the solution undergo no further alteration. This is the case after several hours. The dyestuff is isolated by acidifying the solution and salting-out. When dry it is a dark powder which dyes leather, tanned in any manner, full, brown shades. The usual fastness properties have been appreciably improved by the ammoniacal oxidation. Instead of 4-nitro-1-aminobenzene or 5 - nitro - 2 - aminobenzene-1-sulphonic acid there may be used other amines such as those named in Examples 1 and 2.

What we claim is:

1. A method for the manufacture of conversion products of azo dyestuffs, consisting in oxidizing in the presence of ammonia a polyazo dyestuff formed according to the following general formula:

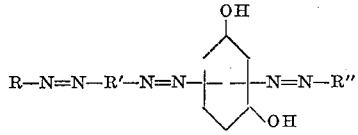

wherein R represents radicals of diazotized aromatic amines of the benzene or naphthalene series selected from the group consisting of aniline, its homologues and sulphonic acids, nitro-, chloro- and nitrochloro-anilines, their homologues and sulphonic acids, 1-amino-2-hydroxybenzene-3-carboxy-5-sulphonic acid, 4-nitro-4'-aminodiphenylamine-2-sulphonic acid and isomeric nitroaminodiphenylaminesulphonic acids, and 4,6-dinitro-2-amino-1 - hydroxybenzene, 1 - aminonaphthalene - 4 - sulphonic acid, R' represents radicals of diazotized aromatic amines of the benzene or naphthalene series selected from the group consisting of 3-amino-1-hydroxybenzene-4-sulphonic acid, 1-aminonaphthalene. 1-aminonaphthalene-6- and -7-sulphonic acid (mixture) and 2-amino-8-hydroxynaphthalene-6-sulphonic acid, and R'' represents radicals of diazotized aromatic amines of the benzene or naphthalene series selected from the group enumerated under R and also 4'-amino-1,1'-azobenzene-4-sulphonic acid.

2. A method for the manufacture of conversion products of azo dyestuffs, consisting in oxidizing in the presence of ammonia and of a heavy metal a polyazo dyestuff formed according to the following formula:

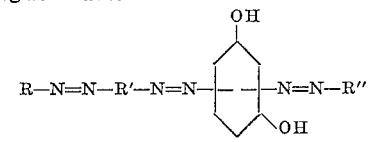

wherein R represents radicals of diazotized aromatic amines of the benzene or naphthalene series selected from the group consisting of aniline, its homologues and sulphonic acids, nitro-, chloro- and nitrochloro-anilines, their homologues and sulphonic acids, 1-amino-2-hydroxybenzene-3-carboxy-5-sulphonic acid, 4-nitro-4'-amino-diphenylamine-2-sulphonic acid and isomeric nitroamino diphenylaminesulphonic acids, and 4,6-dinitro-2-amino-1-hydroxybenzene, 1 - aminonaphthalene-4-sulphonic acid, R' represents radicals of diazotized aromatic amines of the benzene or naphthalene series selected from the group consisting of 3-amino-1-hydroxybenzene-4-sulphonic acid, 1-aminonaphthalene, 1-aminonaphthalene-6- and -7-sulphonic acid (mixture) and 2-amino-8-hydroxynaphthalene-6-sulphonic acid, and R'' represents radicals of diazotized aromatic amines of the benzene or naphthalene series selected from the group enumerated under R and also 4'-amino-1,1'-azobenzene-4-sulphonic acid.

3. A method for the manufacture of conversion products of azodyestuffs, consisting in diazotizing 4-nitro-4'-amino diphenylamine - 2 - sulphonic acid, coupling the diazo-compound with 1-aminonaphthalene-6- and -7-sulphonic acid (mixture), diazotizing and coupling with 1,3-dihydroxybenzene, treating the resulting disazo-dyestuff with diazotized 4-nitro-4'-aminodiphenylamine-2-sulphonic acid, mixing the compound with ammonia, heating the mixture and subjecting same to an oxidizing operation and finally separating the dyestuff thus formed.

4. A method for the manufacture of conversion products of azo-dyestuffs, consisting in coupling first diazotized 4-nitro-4'-aminodiphenylamine-2-sulphonic acid with 1-amino-naphthalene-6- and -7-sulphonic acid (mixture), diazotizing and coupling with 1,3-dihydroxybenzene, treating the resulting disazo-dyestuff with diazotized 4-nitro-1-aminobenzene, subjecting the trisazo dyestuff by heating to an oxidizing operation in presence of ammonia and finally separating the dyestuff thus obtained.

5. A method for the manufacture of conversion products of azo-dyestuffs, consisting in coupling diazotized 4-nitro-4'-aminodiphenylamine-2-sulphonic acid with 1-aminonaphthalene-6- and -7-sulphonic acid (mixture), diazotizing and coupling with 1,2-dihydroxybenzene, coupling the resulting disazo-dyestuff with diazotized 1-amino-2-chlorobenzene-5-sulphonic acid, heating the aqueous solution of the compound in presence of ammonia and subjecting same to an oxidizing operation, and finally separating the dyestuff thus obtained.

6. Conversion products of azo-dyestuffs consisting of compounds of oxidation in the presence of ammonia from resorcinol-polyazo-dyestuffs having the following general formula:

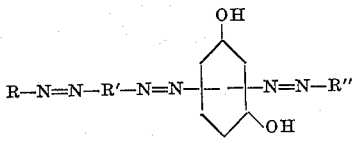

wherein R represents radicals of diazotized aromatic amines of the benzene or naphthalene series selected from the group consisting of aniline, its homologues and sulphonic acids, nitro-, chloro- and nitrochloroanilines, their homologues and sulphonic acids, 1-amino-2-hydroxybenzene-3-carboxy-5-sulphonic acid, 4-nitro-4'-aminodiphenylamine-2-sulphonic acid and isomeric nitro-aminodiphenylaminesulphonic acids, and 4,6-dinitro-2-amino-1-hydroxybenzene, 1-aminonaphthalene-4-sulphonic acid, R' represents radicals of diazotized aromatic amines of the benzene or naphthalene series selected from the group consisting of 3-amino-1-hydroxybenzene-4-sulphonic acid, 1-aminonaphthalene, 1-aminonaphthalene-6- and -7-sulphonic acid (mixture) and 2-amino-8-hydroxy-naphthalene-6-sulphonic acid, and R'' represents radicals of diazotized aromatic amines of the benzene or naphthalene series selected from the group enumerated under R and also 4'-amino-1,1'-azobenzene-4-sulphonic acid.

JAKOB BOSSHART.
FRITZ DOBLER.